United States Patent [19]

Willmore

[11] Patent Number: 4,517,568

[45] Date of Patent: May 14, 1985

[54] ANGLE SET-ON APPARATUS

[75] Inventor: Robert R. Willmore, Millersville, Md.

[73] Assignee: The United States of America as represented by the Secretary of the Air Force, Washington, D.C.

[21] Appl. No.: 347,749

[22] Filed: Feb. 9, 1982

[51] Int. Cl.³ ............................................... G01S 7/38
[52] U.S. Cl. .................................... 343/18 E; 343/368
[58] Field of Search ...................... 343/18 E, 368, 371

[56] References Cited

U.S. PATENT DOCUMENTS 3,879,732  4/1975  Simpson ............................ 343/18 E

OTHER PUBLICATIONS

Skolnik, M. I., "Introduction to Radar Systems", McGraw-Hill Book Co., 2nd Edition, 1980, pp. 278-286.

Drogin, Edwin M., "ALQ-161: Time-Sharing Jammer Power", Microwave Systems News (USA), Oct. 1978, vol. 8, No. 10, pp. 55-65.

*Primary Examiner*—T. H. Tubbesing
*Assistant Examiner*—Jr. Gilberto Barrón

*Attorney, Agent, or Firm*—Donald J. Singer; William Stepanishen

[57] ABSTRACT

An angle set on apparatus for an electronic countermeasure system utilizing a single dual mode phased array antenna which is operated under receiver/processor control to serve as both a transmit and receive element thereby avoiding the need for a separate direction finding system and, since transmit and receive functions share the same antenna, eliminating the need for precision pointing accuracy. The receiver/processor unit would continue to identify emitters using the jamming unit's receive antenna element and, where appropriate, PRI trackers would be assigned. The time of arrival window would then be used to blank the transmitter signal and to switch the phased array to the receive mode. During sequential time of arrival windows the receiver/processor would vary the pointing angle of the phase array until the emitter angle of arrival is determined and stored in memory. At periodic intervals in the future, the receiver/processor unit would again output a time of arrival blanking window and update the stored angle of arrival. During all other time of arrival windows the beam would be pointed to the stored angle of arrival value for high effective radiated power jamming.

7 Claims, 3 Drawing Figures

ANGLE SET-ON APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an electronic countermeasures apparatus, and in particular to an angle set-on apparatus for determining and jamming a hostile radar emitter.

The present trend in electronic countermeasures pods is toward power managed systems which are equipped with a receiver/processor unit. The receiver/processor serves to identify emitters and, where appropriate, assigns PRI trackers to the received pulse trains. A major function of the PRI tracker is to provide time-of-arrival windows to the jammer unit that surrounds the expected arrival time of a hostile emitter pulse. Typically, a time-of-arrival window has a duration of from 1 to 16 $\mu$secs. The presence of a tracker time-of-arrival window allows the jammer unit to modify techniques and parameters for the duration of the window to achieve optimum effectiveness against the received pulse train that are being tracked. By employing multiple tracker units, it is possible to time share the available jamming unit resources against the multiple pulse trains and, thereby, to provide system power management in the time domain. The present receiver/processors are also capable of providing power management in the frequency set-on (FSO) mode. In this technique the receiver/processor, after identifying the emitter, centers the received signal in its IF bandpass. It then samples the center frequency of the jammers noise transmission and, by indirect commands, proceeds to vary the jamming center frequency until it too is centered in the receiver/processor's IF bandpass. Using the frequency set-on technique, the receiver/processor can typically place the noise jamming center frequency to within $\pm 2$ MHz of the received emitter frequency. It is important to note that the absolute frequency accuracy or the receiver/processor or the jammer noise source is unimportant in that both are centered around the received emitter frequency.

The present electronic countermeasure pods are equipped with receiver/processors that perform power management in the time and frequency domains. However, future systems which are equipped with receiver/processor units can be expected to continue to provide time and frequency domain power management and to provide a spatial or angle-of-arrival power management capability. The spatial power mangement technique of using phased arrays will permit the jammer unit 10 to increase its effective radiated power by narrowing its transmit antenna beam around the emitters angle of arrival. The major obstacle to providing a spatial domain power mangement capability in an electronic countermeasure pod is the limited packaging space available.

In a pod application, a typical phased array installation may have eight transmit elements of which each one may have its own low power traveling wave tube amplifier that is driven from a matrix switching lens or beam forming network. In addition, in most conventional approaches, a direction finding system is generally utilized to point the phased array. These requirements increase both the packaging volume and the implementation costs. The problems that are normally associated with pointing a phased array, are aggrevated further by the antenna pattern distortion which can occur in a pod installation. In addition, a further problem exists with conventional phased arrays in that they can only provide on an instantaneous basis either omni or narrow beam coverage, but not both. This limited operation would entail the loss of required continuous coverage every time the beam was narrowed around a particular emitter's angle of arrival. However, this problem has been solved by the development of a dual mode phased array antenna that provides both simultaneous omni and narrow beam coverage. This relatively simple array can be implemented using either the conventional approach of multiple low power traveling wave tube amplifiers or using a single high power traveling wave tube as the drive source. The latter is of importance in that it makes possible a low cost retrofit into existing pod transmitters.

SUMMARY OF THE INVENTION

The present invention utilizes a receiver/processor (R/P) unit, a receive antenna element, and a jamming transmitter output group, which includes a transmit antenna element. A first embodiment utilizes a high power dual mode (transmit/receive) antenna array for replacing the transmit antenna element. A second embodiment utilizes a low power dual mode array for replacing the transmitter output group. The high power array is a transmit antenna which comprises a beam forming network and eight antenna elements. The beam forming network includes power dividers and phase shifters which are connected to the antenna elements. The low power array comprises a beam forming network, which has smaller components and uses less power than the beam forming network of the high power array, an amplifier assembly, and isolation couplers. In the improved electronic countermeasure system, the receiver/processor identifies an emitter with the receive antenna element of the jamming unit and assigns a pulse repetition interval (PRI) tracker window to the jamming transmitter. The window blanks the transmitter while the receiver/processor searches in angle for the emitter using a receive mode of the dual mode beam forming array. When the emitter is located, the jamming unit applies a high effective radiated power (ERP) jamming signal initiated to the transmit mode of the dual mode beam forming array at that emitter angle of arrival.

It is one object of the present invention, therefore, to provide an improved angle set-on apparatus.

It is another object of the invention to provide an improved angle set-on apparatus wherein a dual mode phased array is utilized as both a transmit and receive antenna.

It is still another object of the invention to provide an improved angle set-on apparatus which utilizes a multiple low power traveling wave tube in a phased array for receive and transmit functions.

It is a further object of the invention to provide an improved angle set-on apparatus which utilizes a single high power traveling wave tube in a phased array for receive and transmit functions.

It is still a further object of the invention to provide an improved angle set-on apparatus that eliminates the need for precision pointing accuracy.

It is an even further object of the invention to provide an improved angle set-on apparatus that eliminates the need for an accurate direction finding system.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
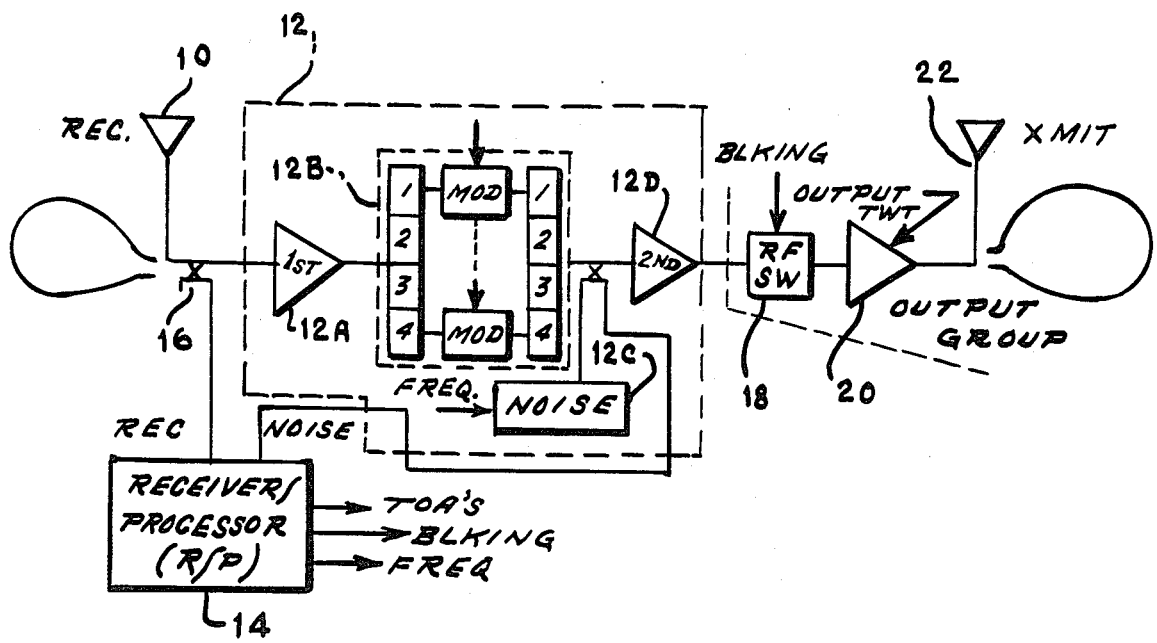
FIG. 1 is a block diagram of a prior art electronic countermeasure system.

Referring now to FIG. 1, there is shown a typical prior art power-managed electronic countermeasure system utilizing receive antenna 10 to receive a hostile emitter signal. The receive antenna 10 is directly connected to the jamming unit 12. The jamming unit 12 comprises an input amplifier unit 12A, a four channel modulator unit 12B, a noise source 12C and an output amplifier unit 12D.

The hostile emitter signal is also applied to the receiver/processor unit 14 by means of coupler unit 16. The receiver/processor unit 14 identifies the hostile emitter and centers the received signal in its IF channels. The receiver/processor unit 14 also samples the noise transmission of the jamming unit 12 to determine the center frequency of the jamming unit's noise transmission. The receiver/processor unit 14 varies the noise jamming frequency unit it is also centered in its IF channels. By utilizing this frequency set on technique the receiver/processor can typically place the noise jamming center frequency to within ±2 MHz of the received emitter frequency. It may also be noted that in the use of this technique that the absolute frequency accuracy of the receiver/processor or the jammer noise source is unimportant because both are centered around the received emitter frequency.

The output group of the prior art electronic countermeasure system comprises an RF switch 18, an output amplifier 20 and a transmit antenna 22. The RF switch 18 which is located between the output of the jamming unit 12 and the output amplifier receiver blanking signals from the receiver/processor unit 14. The output amplifier which receives the noise jamming signal from the jamming unit 12, amplifies the signal level prior to transmission by the transmit antenna 22.

Figure 2:
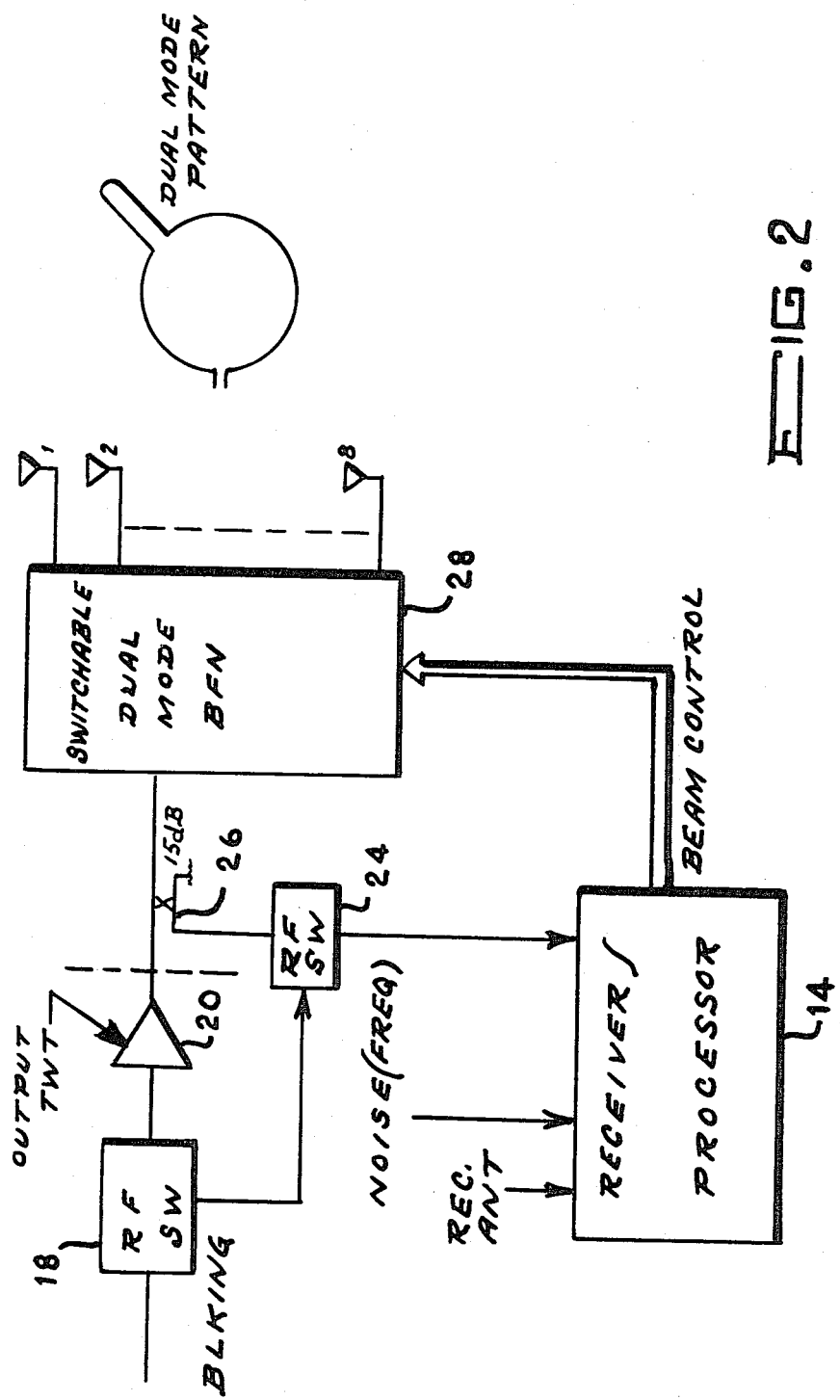
FIG. 2 is a block diagram of the dual mode array angle set-on apparatus utilizing a high power driver.

A typical operational sequence for the power-managed pod electronic countermeasure system is illustrated by the following illustration. As was earlier point out in this system the receiver/processor unit 14 shares the receive antenna element 10 of the jamming unit 12. However, when the receiver/processor unit 14 is using the receive antenna 10 it must blank the transmitter group which is accomplished by sending a blanking signal to the RF switch 18. In typical systems the interruption of jamming signal during the time the receiver/processor is operating, is held to a few percent or less of total transmit time. The jamming unit 12 consists of a channelized repeater with three stages of traveling wave tube amplification-output traveling wave tube plus a first and second driver traveling wave tubes. Noise signal which is generated in the noise unit 12C is inserted into the transmitter group by way of a coupler at the second driver traveling wave tube input. The noise unit 12 utilizes a straight path through the coupler to the receiver/processor unit 14. It is by this path that the receiver/processor unit 14 derives a sample of the jammer's noise center frequency during frequency set-on. The transmit antenna 22 is a low gain horn providing approximately 120° azimuth coverage and 30° elevation coverage. The receive antenna element 10 is typically a spiral antenna or small horn providing similar coverage. The addition of the angle set-on apparatus to provide a spatial power management capability to an electronic countermeasure pod can be accomplished by either replacing the transmit antenna with a high power dual mode array as indicated in FIG. 2 or by replacing the transmitter output group of FIG. 1 with the low power dual mode array of FIG. 3. Both of these implementations will be presented and discussed in the following paragraphs.

In the high power dual mode array implementation of FIG. 2, the entire transmitter group is retained and only the transmit antenna is modified. The transmitter's high power output traveling wave tube 20 is passed through a high power coupler 26 to the dual mode beam forming network 28. The beam forming network 28 comprises a series of power dividers (corporate feed) and controlled phase shifters There are eight outputs from the beam forming network 28, each of which is connected to an element of an eight element array. It should be noted that the beam forming network 28 is a bilateral device which makes it possible to employ the phase array as either a transmit or receive antenna. In the receive mode the RF switch 24 connects the input of the beam forming network, via the high power coupler, to the receiver/processor unit 14. Simultaneously, the input to the output traveling wave tube 20 is removed by way of a blanking RF switch 18. The presence of the 15 dB coupler 26 will reduce signal energy being sent to the receiver/processor unit 14. However, the 10 to 15 dB gain of the phased array will compensate for most of this loss. The receiver/processor sensitivity may also be reduced by the presence of thermal noise in the output traveling wave tube 20. However, it should be noted that receiver/processor sensitivity is required to be high only when identifying TWS emitters (observing sidelobe pulses) that are operating in the lower frequency ranges. In the upper frequency ranges, the phased arrays offset reduced receiver/processor sensitivity by increased signal gain.

Figure 3:
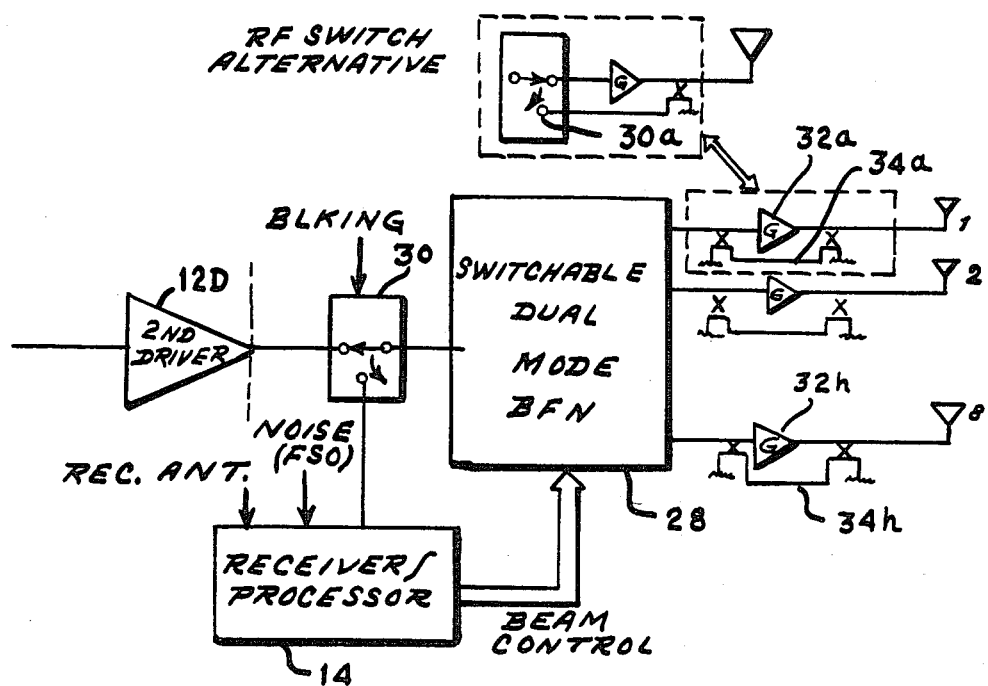
FIG. 3 is a block diagram of a dual mode array angle set-on apparatus utilizing a low power driver.

Turning now to the low power dual mode array implementation of FIG. 3, there is shown that the output from the second driver traveling wave tube driver 12D is connected by a blanking switch 30 to the beam forming network 28. The beam forming network 28 would be functionally identical to that previously described, but would be operated at lower power and thereby utilized smaller components. The eight outputs from the beam forming network 28 would each be amplified by a low power (i.e., 30 watts) phase matched traveling wave tube amplifier assemblies 32a–32h. Bypassing each of the relatively low gain amplifiers 32a–32h (i.e., 25 to 30 dB) are two high isolation couplers 32a–32h with coupling values that may be selected to ensure that all feedback paths are much greater (at least 10 dB greater) than the forward gain. In the receive mode, the signals which are received from the eight elements, bypass the traveling wave tube amplifiers 32a-32h by way of couplers 34a-34h hand are combined in the beam forming network 28. The resulting signal is sent by means of blanking switch 30 to the receiver/processor unit 14. However, if a sensitivity problem is found to exist, the input couplers 34a-34h may be replaced with the alternative RF switch arrangement 36 in which the couplers 34a-34h are connected directly to the blanking switch input 30a to the receiver/processor unit 14. The loss in sensitivity is eliminated due to one less 15 dB output coupler and by higher antenna gain.

The operation of angle set-on apparatus would be identical in both of the dual mode phase array implementations. The receiver/processor unit 14 would continue to search and identify threat emitters using the present spiral receive antenna element 10. The receiver/processor unit 14 would then search in the spatial domain by sending time of arrival windows to the jammer unit 12 that both blanks the amplifier drive signal and switches the beam forming network to the receiver/processor. In sequential time of arrivals, the receiver/processor unit 14 would vary the pointing angle of the phase array until the same signal is located and centered in the narrow beam. Centering of the narrow beam would be accomplished by comparing adjacent angle steps to form an angle gate. It should be noted that this approach will permit the beam to be centered regardless of the antenna pattern distortion. Once the phased array is centered, the angle of arrival of a particular emitter is then stored in memory. On a periodic basis the time of arrival blanking pulse would again be sent and the results used to update the stored angle of arrival value. During all other time of arrival windows the beam would be pointed to the stored angle of arrival value for high effective radiated power jamming.

Although the invention has been described with reference to a particular embodiment, it will be understood to those skilled in the art that the invention is capable of a variety of alternative embodiments within the spirit and scope of the appended claims.

What is claimed is:

1. An angle set-on apparatus for an electronic countermeasure jamming system comprising in combination:
   a receiving antenna to receive a hostile signal from a hostile emitter,
   a jamming means to generate and transmit a jamming signal, said jamming means receiving said hostile signal from said receiving antenna and modulating a noise signal with the center frequency of said hostile signal,
   a switching means connected to the output of said jamming means,
   a beam forming network to receive said jamming signal from said switching means, said beam forming network including a dual mode phased array antenna system that is switchable between the receive and transmit mode, and
   a receiver/processor means coupled to said receiving antenna, said receiver/processor means identifying said hostile signal and determining its center frequency; said receiver/processor means sampling said jamming signal to center it with respect to the center frequency of said hostile signal, said receiver/processor means providing a control signal, said jamming means providing in response to said hostile signal a window blanking signal which blanks said jamming signal while said receiver/processor means searches in angle for said hostile emitter using the receive mode of said dual mode phase array antenna, said beam forming network receiving said control signal from said receiver/processor means, said beam forming network under control from said receiver/processor means locking on to said hostile signal, said switching means coupling said hostile signal to said receiver/processor means, said beam forming network forming a transmission pattern in response to said control signal and radiating said jamming signal toward said hostile emitter.

2. An angle set-on apparatus as described in claim 1 wherein said switching means comprises in combination:
   a first switch for controlling the signal output from said jamming means, and
   a second switch with a coupling means to couple the output of said jamming means and the input of said beam forming network through said second switch to said receiver/processor means, said receiver/processor means simultaneously operating said first switch and said second switch in complimentary modes.

3. An angle set-on apparatus as described in claim 1 wherein said switching means comprises a T/R switch with a transmit and a receive position, said receiver/processor means controlling the switch position of said T/R switch, said transmit position connecting said jamming signal to said beam forming network for transmission, said receive position connecting said hostile signal from said beam forming network to said receiver/processor means.

4. An angle set-on apparatus as described in claim 3 wherein said phased array system comprises a plurality of antenna elements operated by said beam forming network.

5. An angle set-on apparatus as described in claim 4 wherein each antenna element of said plurality of antenna elements is respectively connected to said beam forming network by an amplifier means.

6. An angle set-on apparatus as described in claim 5 wherein each antenna element includes a coupler means to couple signals around said amplifier means, said coupler means comprising a first RF coupler and a second RF coupler, said first RF coupler positioned between said amplifier means and said antenna element, and said second RF coupler positioned between said amplifier means and said beam forming means.

7. An angle set-on apparatus as described in claim 5 wherein each antenna element includes a coupler means to couple signals around said amplifier means, said coupler means comprising an RF coupler and an RF switch, said RF coupler positioned between said amplifier means and said antenna element, said RF switch positioned between said amplifier means and said beam forming means, and wherein said RF switch is controlled by said receiver/processor means.

* * * * *